May 15, 1923.

W. H. DUNKLEY

POWER PROPULSION OF ROAD VEHICLES

Filed Jan. 3, 1923

Inventor.
William Henry Dunkley.
By B. Singer Atty

May 15, 1923.
W. H. DUNKLEY
POWER PROPULSION OF ROAD VEHICLES
Filed Jan. 3, 1923
1,455,720
3 Sheets-Sheet 2
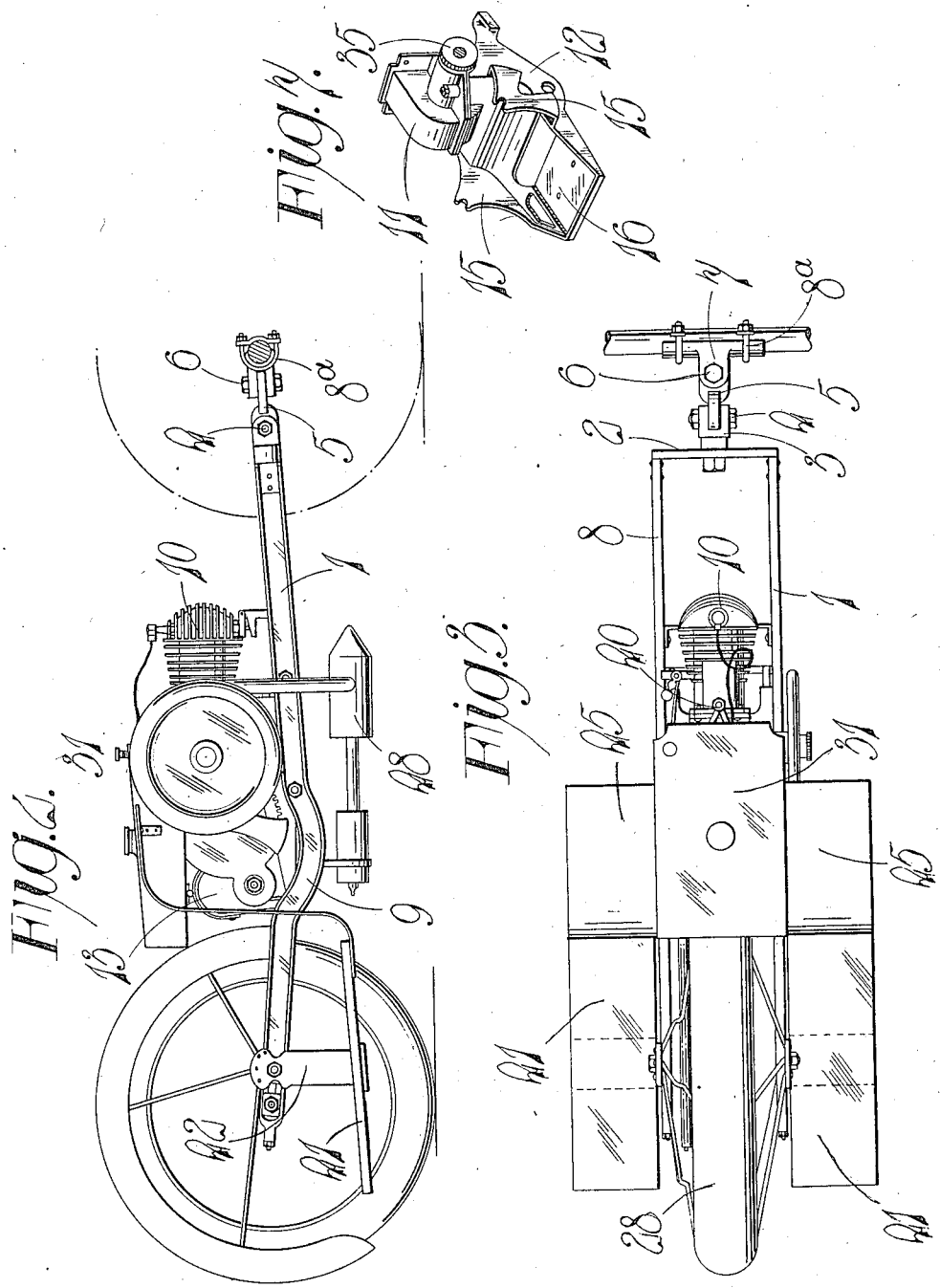

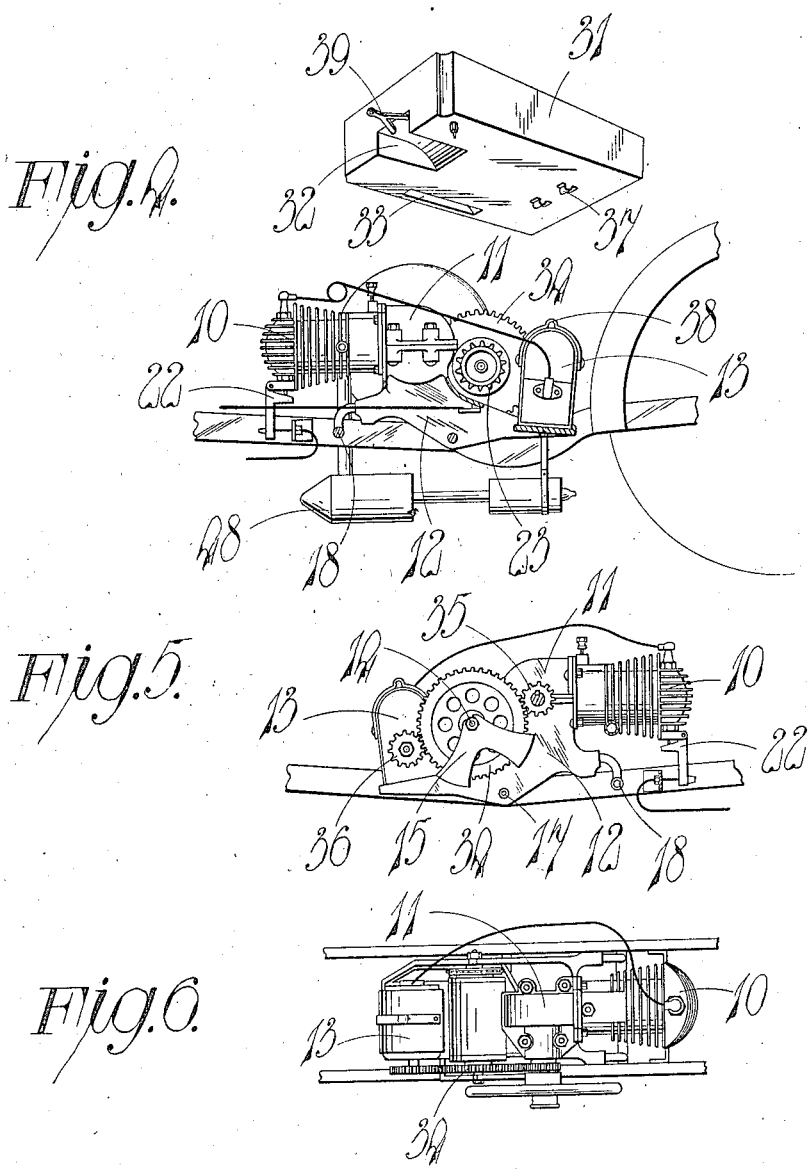

Patented May 15, 1923.

1,455,720

UNITED STATES PATENT OFFICE.

WILLIAM H. DUNKLEY, OF BIRMINGHAM, ENGLAND.

POWER PROPULSION OF ROAD VEHICLES.

Application filed January 3, 1923. Serial No. 610,494.

*To all whom it may concern:*

Be it known that I, WILLIAM HENRY DUNKLEY, a subject of the King of Great Britain, residing at Dunkambulator Works, Jamaica Row, Birmingham, in the county of Warwick, England, have invented certain new and useful Improvements in or Relating to the Power Propulsion of Road Vehicles; and I do hereby declare the following to be a full, clear, and exact description of the same.

This invention relates to road vehicles and is intended primarily for light vehicles for carrying passengers such, for instance, as perambulators or other vehicles which are usually propelled by hand.

The object of the present invention is to provide a generally improved construction of power unit which can be applied to such vehicles for the purpose of propelling them or assisting in their propulsion.

In carrying out my invention I have devised an extremely compact power unit which has all the essentials necessary for self-propulsion and this power unit is suitable for connection to any comparatively light load carrying body.

My improved apparatus comprises a plurality of frame members which are disposed horizontally in spaced relative positions, a transverse member connecting the frame members, an axle mounted on said frame members, one or more road wheels mounted on said axle, a complete power unit mounted on said frame substantially in longitudinal alignment with the road wheel or wheels, a universal or equivalent joint or other suitable connection carried by said transverse member for attaching the propulsion unit to a vehicle, and means whereby the driver may ride on the power unit.

By a complete power unit I mean a power unit having all the essentials for self propulsion. For instance, if an internal combustion engine is used as the source of power, the frame also carries a tank for fuel, a carburetor, a silencer, ignition mechanism, and transmission gear to transmit the power from the crank shaft of the internal combustion engine to the road wheel or wheels. If, however, the power unit is electrically driven the frame will carry secondary batteries, an electric motor and means for transmitting the power from the shaft of the motor to the road wheels. Alternatively, a petrol electric system may be used, in which case the frame will carry a small petrol engine with tank and the necessary fittings, a dynamo and an electric motor.

Alternatively, steam may be used as a means of propulsion, in which case the power unit must include a small steam engine, together with a steam generator and a tank for fuel.

The means for carrying a passenger may take the form of foot boards arranged one on each side of the frame, or may take the form of a seat.

One of the most important applications of my invention is to the propulsion of perambulators and an important part of my invention may, therefore be stated to be the combination with a perambulator of a propulsion unit independently mounted upon its own road wheel or wheels and connected to the under frame or axle or other suitable part of the perambulator.

Referring to the drawings:—

Figure 2 is a view in side elevation taken from the opposite side to that of Figure 1 and shewing the propulsion unit only.

Figure 3 is a plan view of the propulsion unit.

Figure 4 is a side view of the power unit with the tank removed.

Figure 5 is a view of the power unit taken from the opposite side to that of Figure 4 and with certain parts removed.

Figure 6 is a plan view of the power unit with the tank removed.

Figure 7 is a perspective view shewing the means for supporting the magneto and the transmission shaft.

Figure 1:
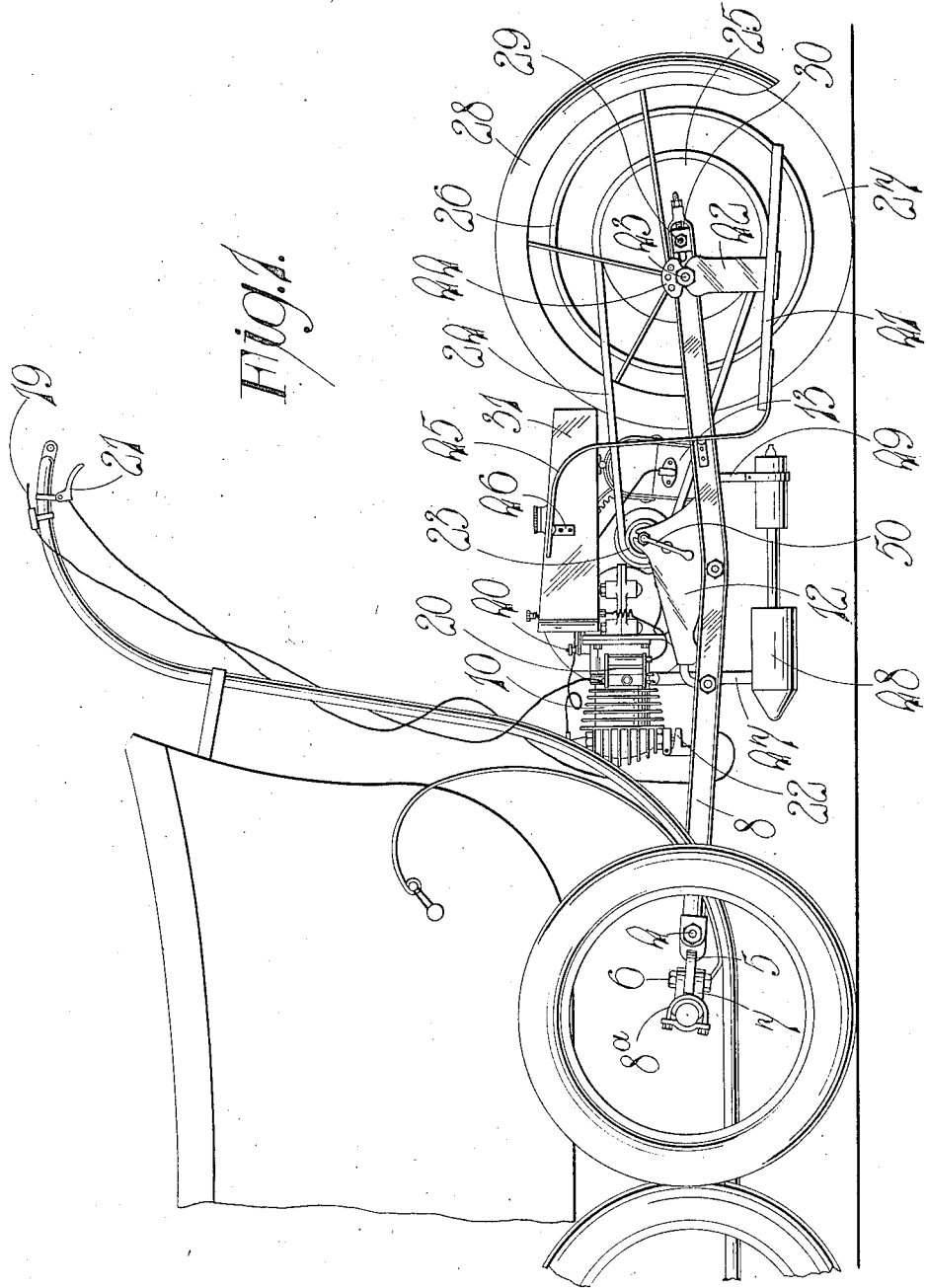
Figure 1 is a view in a side elevation shewing the power unit applied to the propulsion of a perambulator.

In the construction illustrated, the power unit is shewn fitted with an internal combustion engine and in Figure 1 is shewn applied to the propulsion of a perambulator.

In this construction the power unit comprises a forked frame having two side members 1 and 8 united at their forward ends by a transverse bar 2. This transverse bar carries a fork 3 fitted with a transverse pin 4 upon which is pivotally mounted a connecting link 5. The forward end of the connecting link 5 is pivoted upon a vertical pivot 6 carried by a fork 7 which is secured by U bolts 8ᵃ to the axle or other suitable part of the perambulator or other vehicle.

As will be seen from Figures 1 and 2, the side members 1 and 8 are of girder-like form and are bent downwardly at about the middle so as to keep the over-all height of the power unit within the diameter of the road wheel. The side member 1 is shaped somewhat differently to the member 8 and is provided with a curved part 9 to give the necessary clearance for the magneto driving gear.

The engine 10 which is shown, is an air cooled engine arranged horizontally. Its crank case is made in two parts, the upper 11 of which is of ordinary construction, and the lower 12 of which is of a special design which is adapted to form a support for the magneto 13 and for the transmission shaft 14. The shape of the part 12 is shown most clearly in Figure 7 where it will be seen to include two jaws 15 which serve as supports for the transverse transmission shaft 14. The part 12 also includes a kind of tray or support 16 for the magneto 13.

The part 12 is connected to the side members 1 and 8 by transverse bolts 17 and 18.

The power unit is controlled by means of Bowden or other cables which may be taken to a suitable position, such as the handle of a perambulator as shewn in Figure 1. In the construction illustrated three controls are provided, one 19 controlling the throttle valve of the carburettor 20. Another 21 controls an exhaust valve lifter 22 shown more clearly in Figure 5. The third control is not seen in Figure 1 but may be applied to the opposite side of the handle from that shown in Figure 1 and it operates upon a clutch mounted upon the shaft 14. Any suitable form of clutch may be employed, the one element being driven from the engine and the other element being provided with a sprocket 23 connected by a chain 24 to a sprocket 25 associated with the road wheel. This clutch may be operated by a clutch lever 50.

The road wheel 26 is preferably provided with a pneumatic tyre 27 and a mud guard 28 and it is mounted upon an axle 29 which can be adjusted in slots 30 in the members 1 and 8.

The carburettor 20 receives fuel which is stored in the tank 31 mounted above the crank case of the engine.

This tank 31 may also have within it a portion for carrying lubricating oil and the necessary connections for lubricant are provided although not shewn.

The underside of the tank, see Figure 4, is provided with a central recess 32 to enable it to fit over the upper part 11 of the crank case of the engine and a second recess 33 in order to give the necessary clearance for the gear wheel 34 which transmits the motion from a gear wheel 35 on the engine crank shaft to a gear wheel 36 upon the magneto shaft.

The underside of the tank is also provided with a pair of spaced eyes 37 which receive a transverse securing bolt 38 on the top of the magneto whilst the forward end of the tank is provided with an extending bracket 39 which is secured by a bolt 40 to the top of the engine.

Provision is made for carrying the driver by providing foot boards 41, one on each side of the road wheel 26. These foot boards are supported by brackets 42 secured upon the members 1 and 8 by bolts 43. These brackets 42 may also include upper portions 44 which carry the supports for the mud guard 28.

At their forward ends the foot boards 41 are provided with a sheet metal or other shield 45 which extends upwardly to form a dress guard between the foot boards and the power unit. This shield 45 is connected by brackets 46 to the sides of the tank.

The exhaust from the engine is led by a pipe 47 to a silencer 48 carried by a bracket 49 and disposed beneath the frame.

Although I have described and illustrated a propulsion unit capable of carrying one passenger only, it will be understood that provision may be made for carrying additional passengers on the propulsion unit if desired.

Although I have shewn the power unit connected to about the centre of the rear axle of a perambulator I wish it to be understood that it may be connected to any other part of the perambulator. For instance, the road wheel of the propulsion unit may if desired be arranged in line with the wheels at one side of the perambulator. Alternatively, the propulsion unit may be arranged in advance of the perambulator if desired or centrally under the perambulator or vehicle.

Particularly in cases where the power unit is arranged beneath the perambulator or vehicle the construction of the passenger carrying device may be modified. If foot boards are used they may be made to project considerably to the rear or in advance of the power unit so that they will extend beyond the one end or the other end of the vehicle so that a passenger can stand upon them. In such an arrangement it may be necessary to provide one or more wheels preferably mounted in swivel bearings beneath the end of the foot board or boards.

What I claim then is:—

A propulsion unit for road vehicles comprising a frame, an axle mounted on said frame near the rear end thereof, a road wheel mounted on the axle and arranged midway between the sides of the frame, a complete power unit mounted on said frame in advance of said axle, means at the front end of the frame for detachably connecting said unit to a vehicle so that said unit is supported at the rear end by said road wheel and at the front end by the vehicle to which the unit is connected, foot boards on each side of the frame abreast of said road wheel, brackets attached to said frame and supporting said foot boards, and shields attached to foot boards and to an element of said power unit.

In witness whereof I affix my signature.

W. H. DUNKLEY.